(12) United States Patent
Hirokawa et al.

(10) Patent No.: US 6,236,544 B1
(45) Date of Patent: May 22, 2001

(54) ACTUATOR ARM ASSEMBLY FOR A MAGNETIC DISK APPARATUS

(76) Inventors: Mamoru Hirokawa, 3488-15 Ooaza Higashiobokata, Azuma-mura, Sawagun, Gunma 379-22; Nobuyuki Kobayashi, 1508-50, Kou, Komoro-shi, Nagano 384; Hideji Suzuki, 449-2, Ooaza Kashiwazaki, Higashimatsuyama-shi, Saitama 355, all of (JP)

( * ) Notice: Subject to any disclaimer, the term of this patent is extended or adjusted under 35 U.S.C. 154(b) by 0 days.

(21) Appl. No.: 09/297,371
(22) PCT Filed: Nov. 4, 1997
(86) PCT No.: PCT/JP97/04010
  § 371 Date: Jun. 1, 1999
  § 102(e) Date: Jun. 1, 1999
(87) PCT Pub. No.: WO98/20489
  PCT Pub. Date: May 14, 1998

(30) Foreign Application Priority Data

Nov. 5, 1996 (JP) .................................................... 8-293004

(51) Int. Cl.[7] ........................................................ G11B 5/54
(52) U.S. Cl. ...................................... 360/266.1; 360/265.7
(58) Field of Search ............................... 360/266.1, 265.7

(56) References Cited

U.S. PATENT DOCUMENTS

| 5,768,064 | * | 6/1998 | Baasch et al. | 360/106 |
| 5,828,521 | * | 10/1998 | Hasegawa | 360/104 |
| 5,844,754 | * | 12/1998 | Stefansky et al. | 360/106 |
| 5,862,019 | * | 1/1999 | Larson | 360/106 |

* cited by examiner

*Primary Examiner*—Jefferson Evans
(74) *Attorney, Agent, or Firm*—Oliff & Berridge, PLC.

(57) ABSTRACT

A body and an arm are produced as separate components, a fitting recess and a flange are formed on the body, and a magnetic head mounting portion, a fitting portion capable of being fitted to and removed from the fitting recess of the body, and an engagement portion engaging with the flange of the body and prevented from falling off in an axial direction are formed on the arm. At least two fitting recesses are formed in an interval in the axial direction of the body. The arm is fitted to the body, and the fitting portion is molded by a resin to the body. A moving coil of a motor is molded to the body. The fitting portion of the arm is shaped into a ring shape. The fitting portion is shaped into the ring shape having a transverse opening. A rotary bearing having, or not having, a sleeve is fitted into a shaft hole of the body.

10 Claims, 12 Drawing Sheets

45° TURN

ACTUATOR ARM ASSEMBLY FOR A MAGNETIC DISK APPARATUS

FIELD OF THE INVENTION

The invention relates to components of actuators, such as a carriage and components thereof, for a magnetic disc apparatus (hard disc apparatus) as an external memory of an electronic apparatus such as a personal computer and a work station.

BACKGROUND OF THE INVENTION

An actuator for a magnetic disc apparatus has a carriage supporting a magnetic head mounted thereon. By driving a voice coil motor (VCM), the carriage is reciprocally rotated to reciprocally rotate the head across a magnetic recording medium (or disc) so as to position the head at a desired track of the disc.

Figure 10:
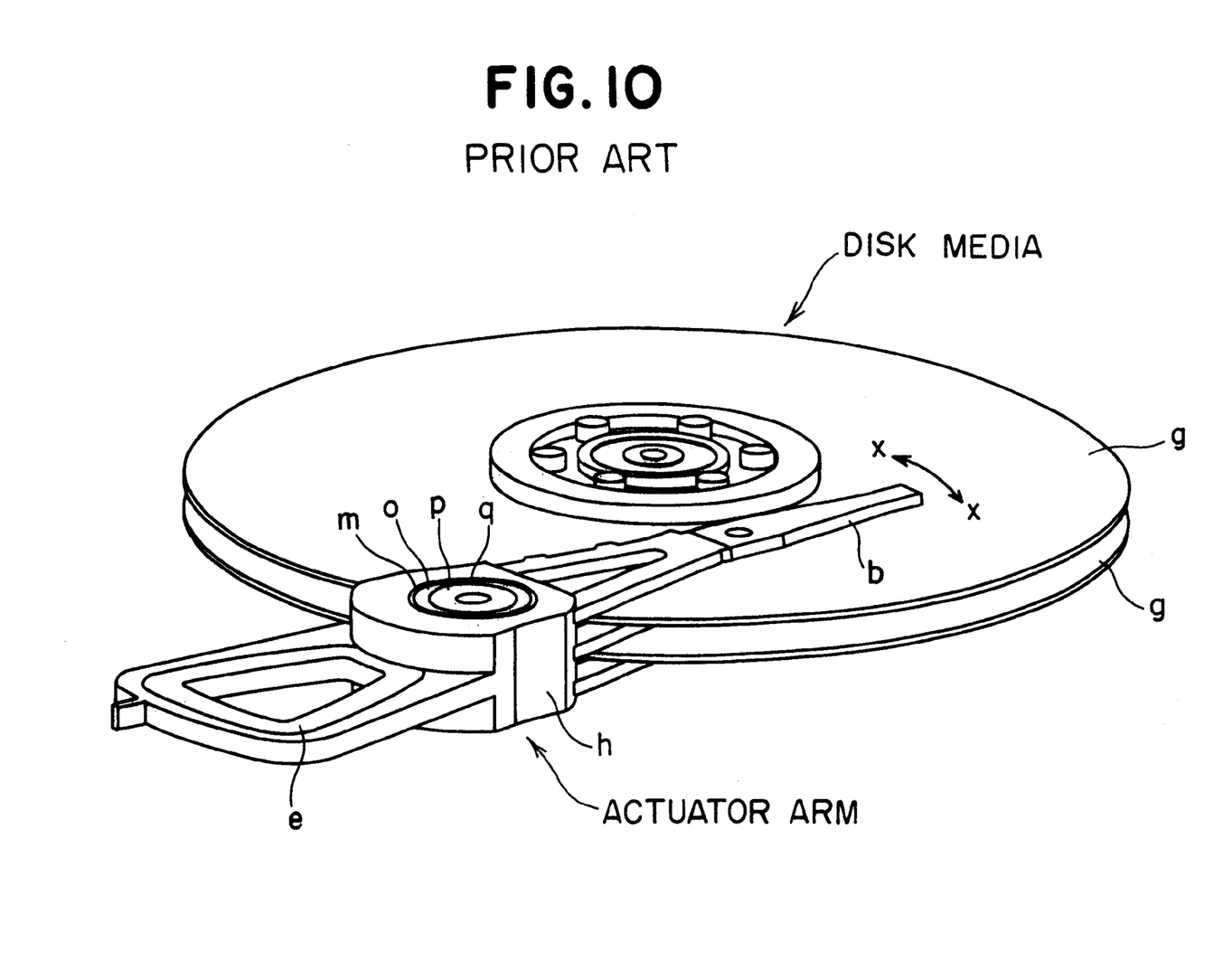
FIG. 10 is a view for describing an actuator and discs in a magnetic disc apparatus.
Figure 11:
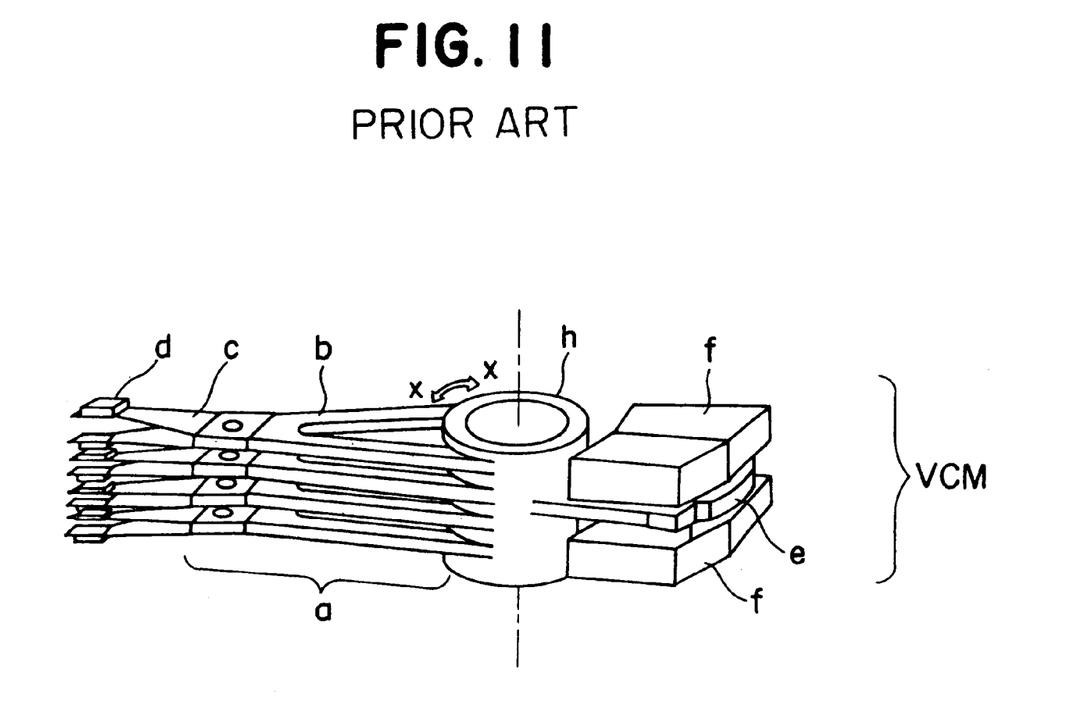
FIG. 11 is a view for describing a prior art actuator for a disc apparatus.

FIG. 11 shows this type of actuator. As shown, the carriage a has a plurality of arms b. A magnetic head d for recording and reproduction is mounted via a suspension on the free end of each arm b. A moving coil e of a VCM is mounted on the opposite side of the arms b of the carriage a. Permanent magnets f are mounted in an interval above and below the moving coil e. As shown in FIG. 10, the actuator is disposed aside a plurality of discs g disposed one above another in an internal, the magnetic heads provided on the end of the arms b are provisionally set over the discs g. The VCM is driven by passing the current to the moving coil e, the carriage a is reciprocally rotated in the directions of arrows X in FIGS. 10 and 11, thus causing reciprocal rotation of the arms b in the same directions across the discs g, which are being rotated by a motor (not shown). In this way, each magnetic head d is positioned to a desired track of each disc g.

Figure 8A:
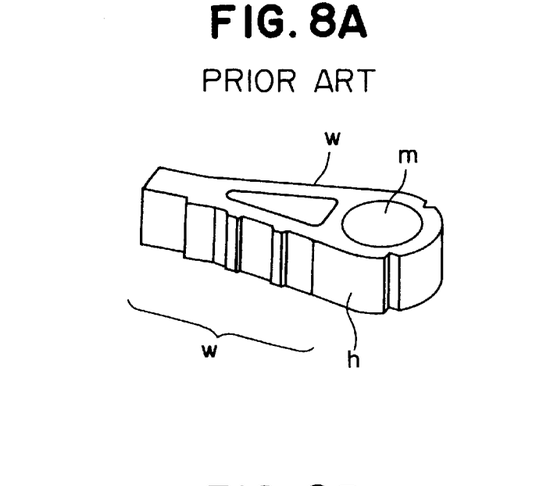
FIG. 8A is a view for describing a die cast eventual carriage in the prior art.
Figure 8B:
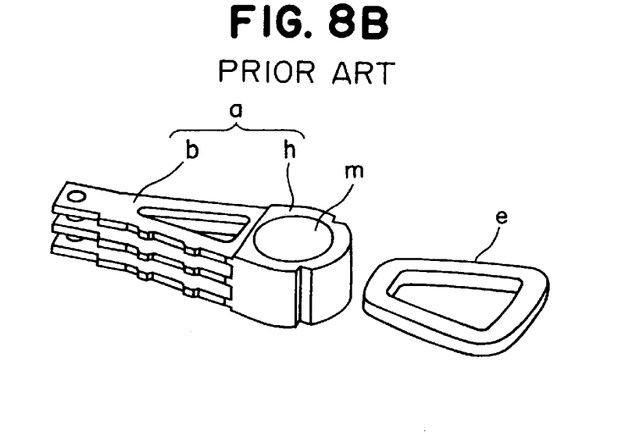
FIG. 8B is a view for describing a carriage obtained by machining the eventual carriage shown in FIG. 8A and a moving coil.
Figure 8C:
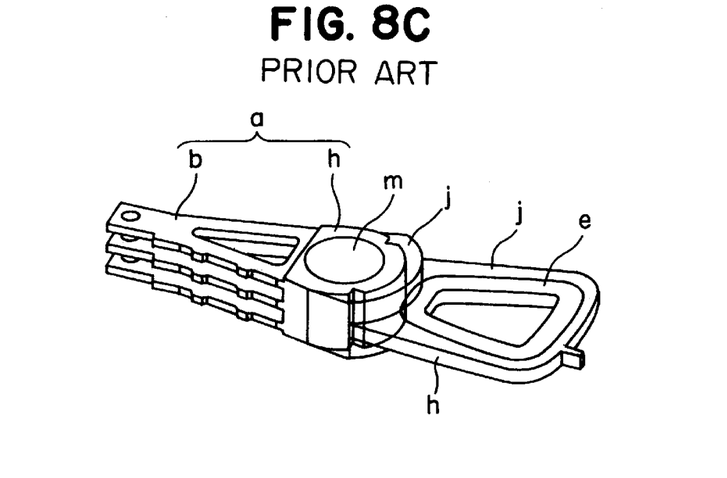
FIG. 8C is a view for describing the molding of the carriage and the moving coil shown in FIG. 8B.

In the prior art, carriages having various structures and shapes have been used. FIG. 8b shows one such carriage. This carriage is obtained by cutting an eventual carriage a having a shape as shown in FIG. 8A, which is an extrusion molding product w of aluminum having a angularly cylindrical body part h and an arm part for a plurality of arms b. This molding product w is cut to form a body h and the plurality of arms b as shown in FIG. 8B. For mounting the moving coil e of the VCM on the carriage a, the carriage a and the moving coil e are set in a resin molding die, and a resin is then pressure poured into the die. In this way, as shown in FIG. 8C, the outer periphery of the moving coil e is molded in the resin j and also molded by the same to the body h. It is possible to fabricate the eventual carriage a shown in FIG. 8b by aluminum die casting as well.

Where the eventual carriage shown in FIG. 8B is fabricated as an extrusion molding product, the following drawbacks are present.

①  Operations of cutting and burr removal, which should be done after the molding operation, are cumbersome and increase personal expenditures and cost.

②  Particularly, it is necessary in the burr removal operation to remove even very fine burrs of the order of microns. This operation, therefore, is thus difficult to be done with the naked eyes, and it is necessary to use an enlarging lens or a microscope, leading to inferior operation efficiency and increasing the personal expenditures.

③  Usually Series 6063 aluminum is used for the extrusion molding. This material has viscosity, making it difficult to remove burrs and also cut it. More cost is thus necessary than in the case of the aluminum die casting.

④  Mass production property is lacking, leading to cost increase.

⑤  High equipment cost for the machining is required, which is a great economical burden.

Where the eventual carriage shown in FIG. 8B is fabricated as an aluminum die cast product, the following drawbacks are present.

①  Operations of burr removal, cutting burr removal again and plating, which should be done after the molding operation, are very cumbersome and increase costs.

②  Particularly, it is necessary in the burr removal operation to remove even very fine burrs of the order of microns. This operation, therefore, is thus difficult to be done with the naked eyes, and it is necessary to use an enlarging lens or a microscope, leading to inferior operation efficiency and increasing the personal expenditures.

③  The product has numerous micropores. If the micropores are left as such, air that is heated by heat generated from the disc drive motor is gasified and blown against the disc g through the micropores, and the disc g may thus be fogged or contaminated or damaged.

④  To preclude the drawback in ③ above, the plating film may be formed as thick as being enough to completely close the micropores. By so doing, however, the cost is increased.

⑤  From the above drawbacks, a lower limit is imposed on the thickness of the arms, and the arms are inevitably thick and heavy.

Figure 9A:
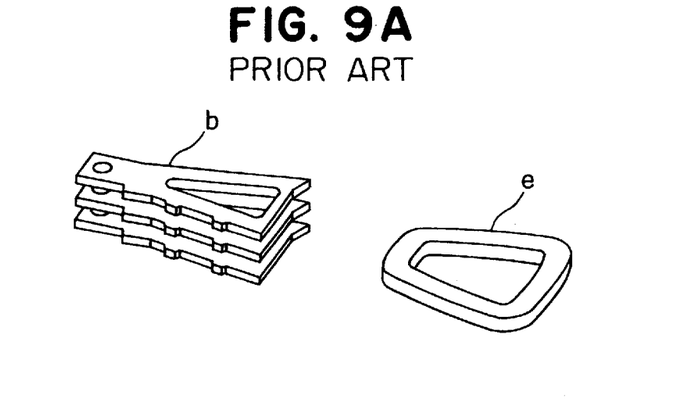
FIG. 9A is a view for describing arms obtained with a press and a moving coil in the prior art.
Figure 9B:
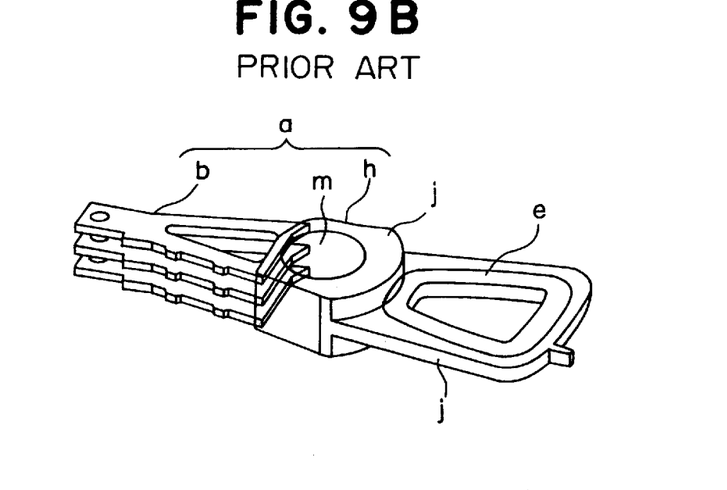
FIG. 9B is a view for describing the molding of the arms and the moving coil shown in FIG. 9A.
Figure 9C:
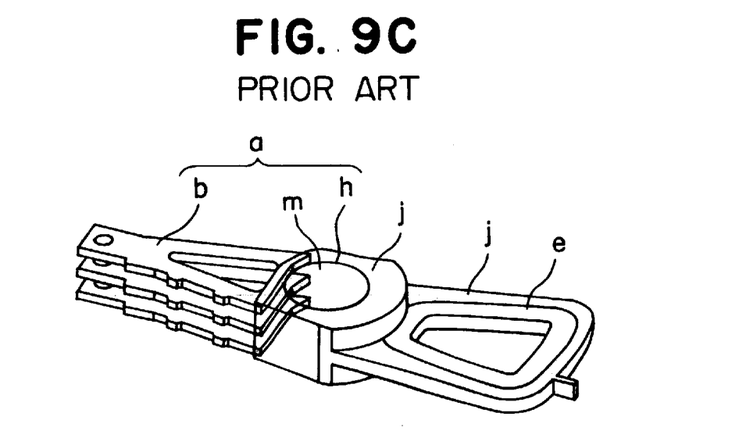
FIG. 9C is a view showing the completed structure.

FIGS. 9A to 9C show a molded carriage a, which is provided for precluding the above drawbacks. This carriage a is fabricated by simultaneously molding a body h and arms b produced with a press in resin j. Specifically, the carriage a is obtained by setting a plurality of aluminum arms b such as to be spaced apart at an interval in a resin molding die, and resin is pressure poured into the die, thus molding a resin body h while at the same time burying stem parts of the arms b in the resin of the body h and thus making the arms b to be integral therewith. When mounting the moving coil e on this carriage a, the carriage a and the moving coil e are set in the same resin molding die, and resin is again pressure poured thereinto, thus further molding the outer periphery of the preliminary resin molded body h in the resin while at the same time molding the moving coil e in the resin to be integral with the body h.

This molded carriage is free from the drawbacks inherent in the aluminum die cast carriage or the extrusion molding product carriage, but it ha the following drawbacks.

①  Since only end parts (i.e., stem parts) of the arms b are molded in the resin j when forming the body h by the resin molding, unlike the one-piece molding having the body h and the arms b, the end parts of the arms b are liable to be vibrated. The actuator is reciprocally rotated several tens of thousands of time per second, and it is thus vibrated, although slightly, as it is moved. These vibrations give rise to a resonance, thus increasing the vibrations of the end parts of the arms b. Usually, the magnetic head d mounted on the free end of the arm b as shown in FIG. 11 and the associated disc g as shown in FIG. 10 are spaced apart by as small distance as several microns. Therefore, by the resonance noted above the head d may be brought into contact with the disc g, and both the head d and the disc g may possibly be damaged.

②  Since the body h is made of a resin while the arms b are made of aluminum, the arms b may be expanded and distorted in the order of microns by heat generated from the motor driving the disc g. By such distortion, the head mounted on the end of the arm b may be brought into contact with the disc g.

③ Since the arms b are set such that they are spaced apart in the die for molding their stem parts in the resin h, deviation of their position by the pressure of the resin pressure poured into the die is liable, resulting in fluctuations of their mounting positions relative to the body h and also their interval. Particularly, deviation of the dimension, by which the arms b product from the body h, is liable, resulting in fluctuations of projecting length of the arms b.

④ A resin molder for molding the body h, a resin molder for molding the arms b and man power for setting the necessary number of arms b in the die for molding the moving coil e to the body h, are necessary, thus increasing the cost. Since a bearing insertion part of the carriage is made of resin, resonance generation is liable, prevention of this dictates a bearing assembly having a complicated structure.

⑤ In the carriage a, as shown in FIG. 10, a bearing (rotary bearing) p with a sleeve o is secured to the body h by pressure fitting it in a shaft hole m of the body h, and a shaft q is secured to the bearing p by pressure fitting it in a center hold of the bearing p, thus permitting smooth reciprocal rotation of the carriage a. However, since the sleeve o, which is fabricated from a metal with a high machining accuracy, is pressure fitted in the shaft hole m in the resin which is difficult to ensure high machining accuracy, it is difficult to make the shaft hole h and the sleeve o to be integral; thus readily giving rise to resonance.

SUMMARY OF THE INVENTION

An object of the invention is to provide actuator components, such as a carriage and components thereof, for a magnetic disc apparatus, which can solve the problems inherent in the prior art carriages as discussed above.

Figure 3:
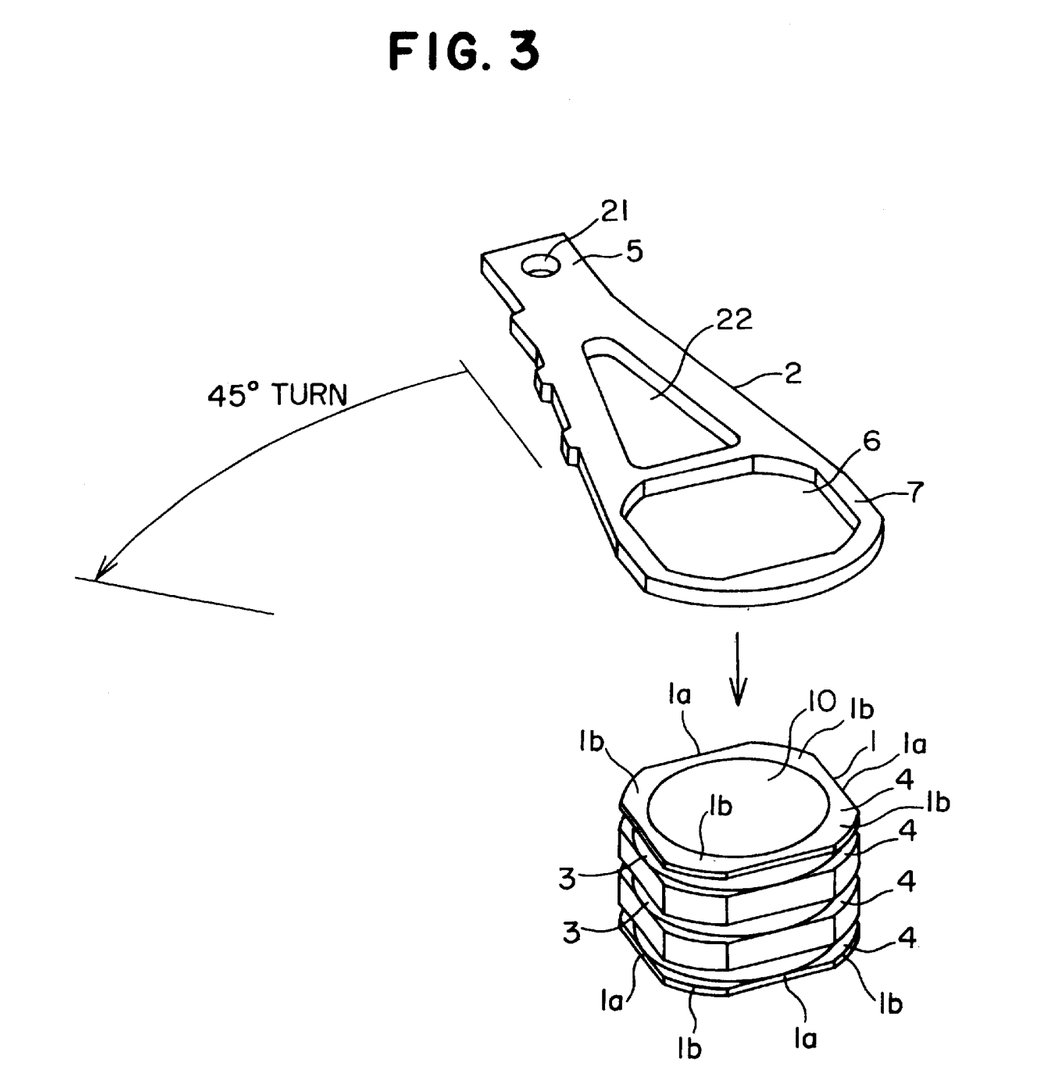
FIG. 3 is a view for describing in detail the assembling of a body and an arm in a carriage according to the invention.

One actuator component for a magnetic disc apparatus according to the invention concerns the actuator carriage body. This carriage body 1 is an actuator component, on which arms 2 supporting magnetic heads mounted thereon for recording and reproduction. The arms 2 are reciprocally rotated with the rotation of and in the same directions as the body for causing reciprocal rotation of the magnetic heads across discs of the magnetic disc apparatus. As shown in FIGS. 1A to 1E to FIG. 3, the body 1 is a member separate from the arms 2 and cylindrical in shape. Its outer periphery has fitting recesses 3 formed one above another and flanges 4 defined between adjacent ones of the fitting recesses 3. As shown in FIG. 3, the flanges 4 serves to prevent detachment of the arms 2 having been fitted in the fitting recesses 3. It is possible to form two or more fitting recesses 3 spaced apart in the axial direction of the body 1.

Figure 1A:
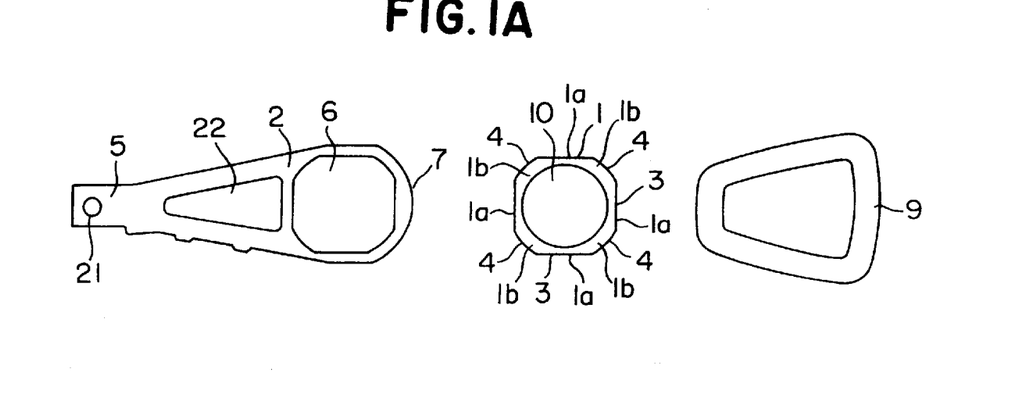
FIG. 1A is an exploded perspective view showing a carriage as a first embodiment of the invention.
Figure 1B:
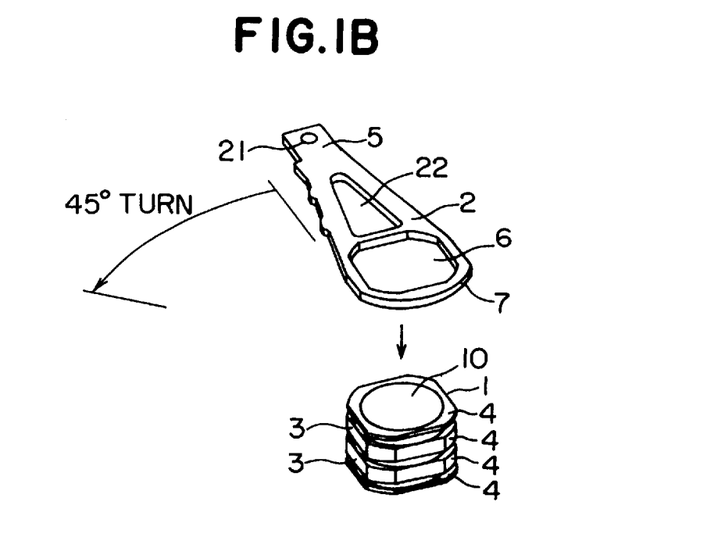
FIGS. 1B and 1C are views for describing the assembling of a body and an arm of the same carriage.
Figure 1C:
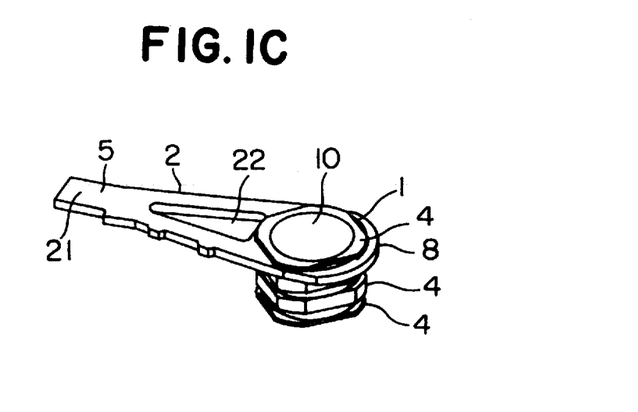
Figure 1D:
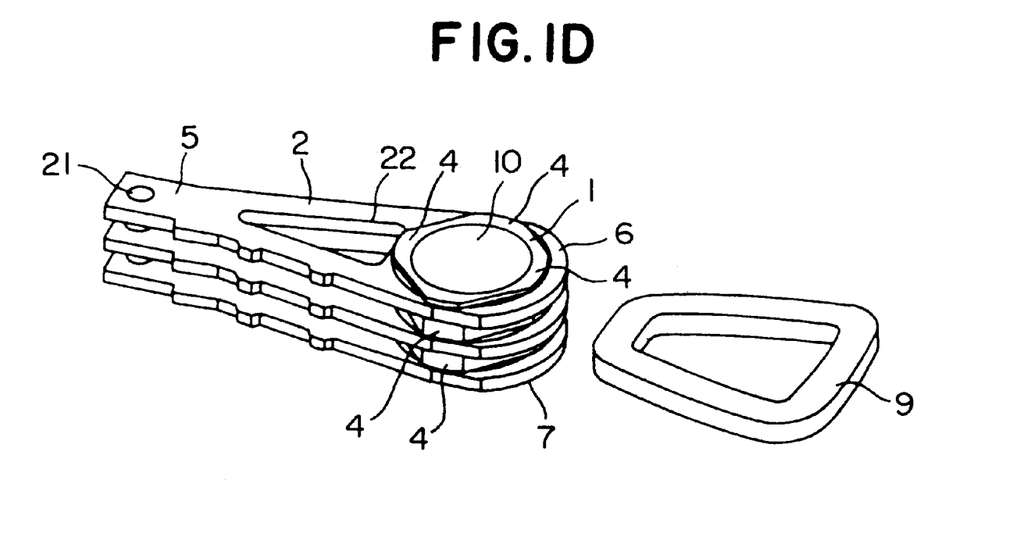
FIGS. 1D and 1E are views for describing the molding of a moving coil to the same carriage.

Another actuator component for a magnetic disc apparatus according to the invention concerns the actuator carriage arm. The arms 2 are formed separately from the body 1. Each arm 2 has a head mounting portion 5 formed in a free end part and a fitting portion 6 and an engagement portion 7 formed in a stem part. A magnetic head can be mounted on the head mounting portion 5. The fitting portion 6 can be fitted in and removed from each fitting recess 3 in the outer periphery of the body 1 in a predetermined orientation relative thereto. When the fitting portion 6 is fitted in a fitting recess 3, the engagement portion 7 is adapted to engage with flanges 4 of the body 1 and thus prevents the detachment of the arm 2 in the axial direction of the body 1. As shown in FIG. 1C, the fitting portion 6 of the arm 2 has a ring-like shape so that it can be fitted in and removed from a fitting recess 3. It can be fitted on the body 1 from the upper end thereof in a predetermined orientation relative thereto for being fitted in the fitting recess 3. The engagement portion 7 may be formed on the outer side of the fitting portion 6 such that by turning the arm 2 with the fitting A further actuator component for a magnetic disc apparatus according to the invention concerns a carriage. In this carriage, a body 1 as shown in FIGS. 1A to 1E and 2A to 2C, which has its outer periphery having fitting recesses 3 formed one above another and flanges defined between adjacent ones of the fitting recesses 3, and arms 2 as shown in FIGS. 1a to 1e and 3, which each have a free end part having a head mounting portion 5 capable of supporting a magnetic head mounted thereon and a stem part having a fitting portion 6 and an engagement portion 7 capable of being fitted in and removed from a fitting recess 3 in a predetermined orientation relative thereto, are formed separately. As shown in FIG. 1b the fitting portion 6 of each arm 2 is fitted in a fitting recess 3 of the body 1, and as shown in FIG. 1c the engagement portion 7 of the arm 2 is thus brought into engagement of flanges 4 of the body 1. As shown in FIG. 1d, a plurality of arms 2 are thus fitted such that they will not be detached in the axial direction of the body 1.

A still further actuator component for a magnetic disc apparatus according to the invention again concerns a carriage. In this carriage, as shown in FIG. 10 the engagement portions 7 of a plurality of arms 2 are held in engagement with flanges 4 of the body 1 so that the arms 2 will not be detached in the axial direction of the body 1, and then the fitting portions 6 are molded by resin 8 to the body 1.

Figure 1E:
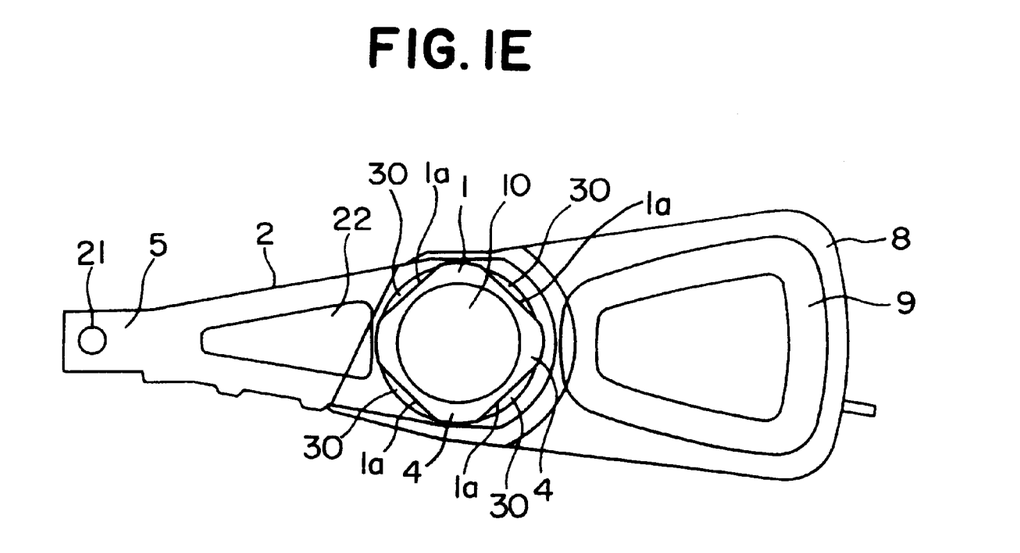

A yet further actuator component for a magnetic disc apparatus according to the invention concerns a carriage with a moving coil, that is, an actuator component, in which a moving coil is mounted on a carriage. Specifically, when molding the fitting portions 6 of the arms 2 by resin 8 to the body 1 as descried above, as shown in FIG. 1E a moving coil 9 for causing reciprocal rotation of the carriage is molded at the same time by resin 8 to the body 1 such that it projects in the opposite direction to the arms 2.

Figure 5A:
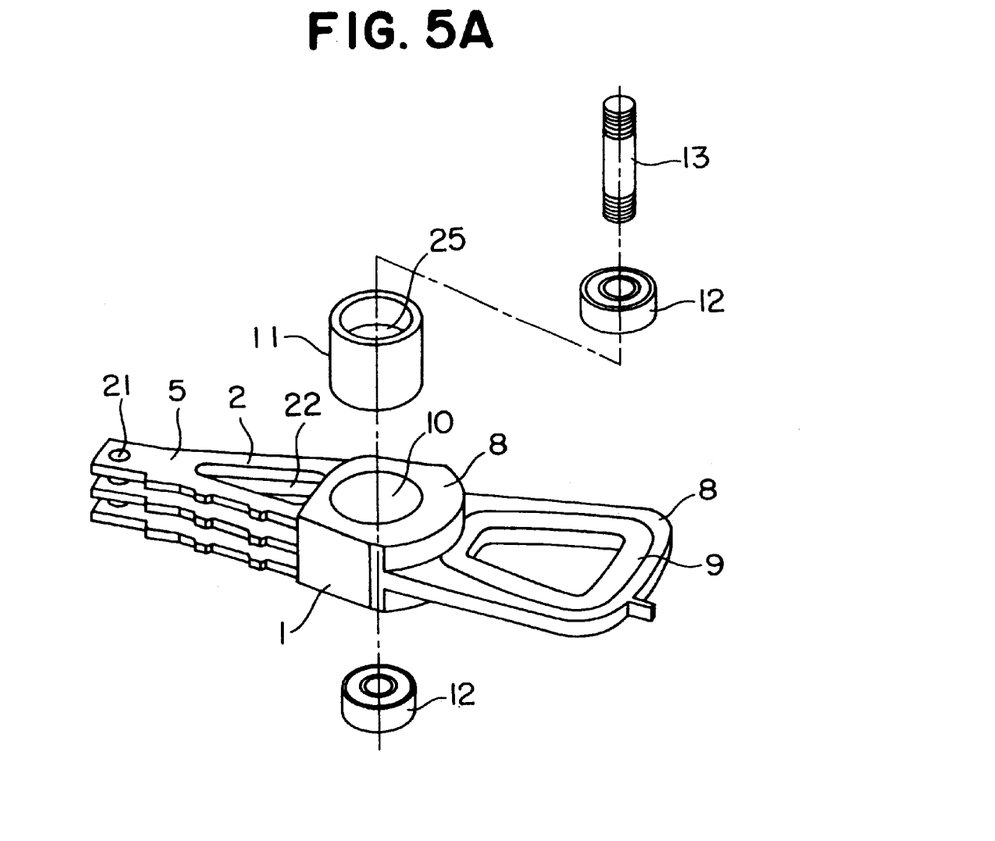
FIG. 5A is a view for describing an example of assembling of a bearing and a rotary shaft in a carriage according to the invention.
Figure 5B:
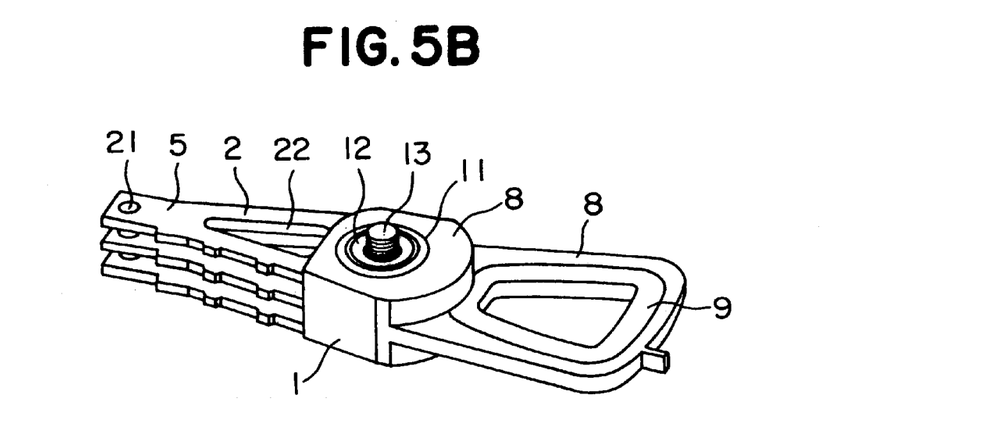
FIG. 5B is a perspective view showing the completed assembly.
Figure 7A:
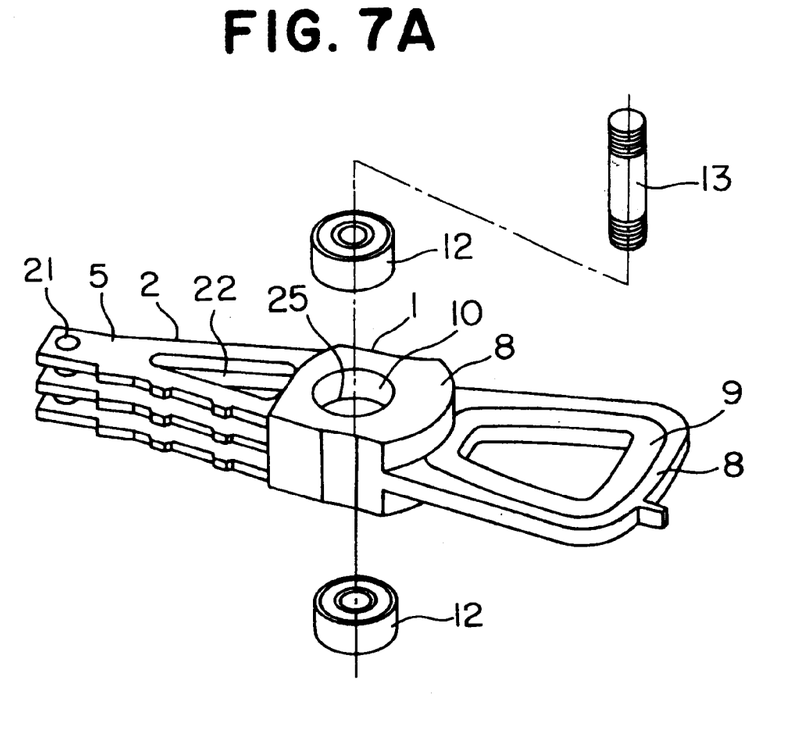
FIG. 7A is a view for describing a different example of assembling of a bearing and a rotary shaft in a carriage according to the invention.
Figure 7B:
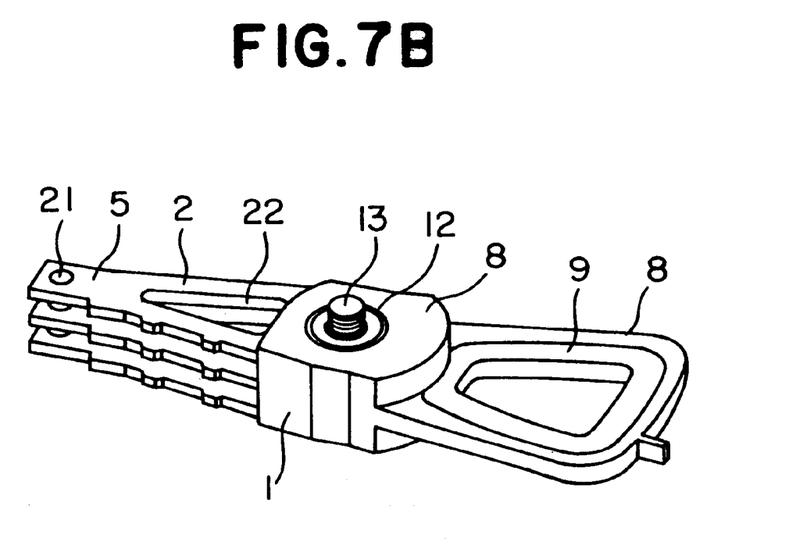
FIG. 7B is a perspective view showing the completed assembly.

A yet another actuator component for a magnetic disc apparatus according to the invention concerns a carriage with a rotary bearing, that is, an actuator component, in which a rotary bearing 12 and a rotary shaft 3 are mounted on a carriage. Specifically, as shown in FIGS. 5A and 5B, in this actuator component the rotary bearing 12 with a sleeve 11 is mounted in a shaft hole 10 formed in a body 1, and the rotary shaft 13 is mounted in the rotary bearing 12. As an alternative carriage with a rotary bearing, as shown in FIGS. 7A and 7B it is possible to mount a sleeve-less rotary bearing 12 in the shaft hole 10 of the body 1 and then mount the rotary shaft 13 in the rotary bearing 12.

BEST MODES FOR CARRYING OUT THE INVENTION

A first embodiment of the component of actuator for magnetic disc apparatus according to the invention will now be described. This embodiment of the component of actuator concerns a carriage. This carriage as well as a body and arms as components of the carriage will now be described. As shown in FIG. 1A in this carriage a body 1 and a plurality of arms 2 are formed separately, and the plurality of arms 2 are mounted on the body 1 at a uniform interval in the axial direction (i.e., vertical direction) thereof.

Figure 2A:
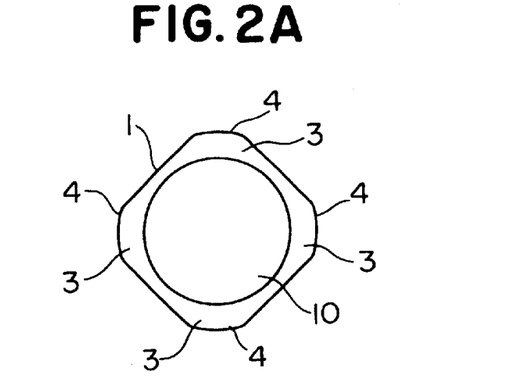
FIG. 2A is a plan view showing a body of the carriage as the first embodiment of the invention.
Figure 2B:
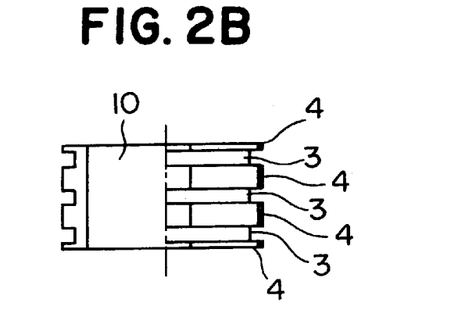
FIG. 2B is an front view, with a left part in section, showing the same body.
Figure 2C:
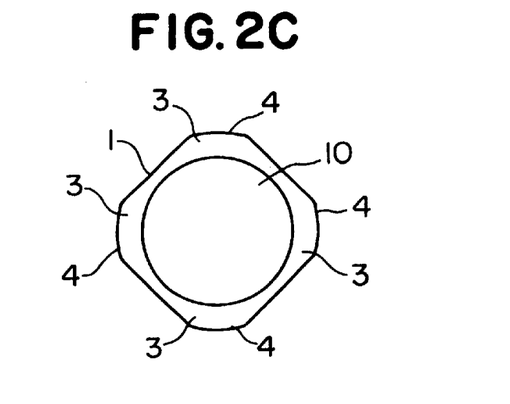
FIG. 2C is a bottom view showing the same body.

As shown in FIGS. 2A to 2C, the body 1 is mad of aluminum, and it is angularly cylindrical in shape, i.e., has an octagonal outer shape, having a cylindrical shaft hole 10. Its outer periphery has two or more truly ring-like fitting recesses 3 formed pittedly at a uniform interval in the axial direction and flanges defined over, under and between adjacent ones of the fitting recesses 3. The flanges 4 are formed by four corners 1b projecting outwardly from the outer peripheries of four flats 1a of the octogonal body 1.

The arms 2 are formed from an aluminum sheet with a press. As shown in FIG. 3, the arm 2 has a shape flaring from its free end part toward its stem part. The free end part has a head mounting portion 5, on which a magnetic head can be mounted either directly or indirectly via a suspensor or the like. The mounting portion 5 has a thorough hole 21. An intermediate part of the arm 2 has a window 22, which is formed for the purpose of reducing the weight. The stem part has a fitting portion 6 and an engagement portion 7. The ring-shaped portion 6 has an octagonal hole of the same shape as the outer shape of the body 1 and having dimensions slightly greater than the body 1. As shown in FIG. 3, the fitting portion 6 can be moved along the axial direction of the body 1 to be fitted on the body 1 from above in the same orientation as the outer shape of the body 1. An outer edge portion of the fitting portion 6 constitutes an engagement portion 7. By turning the arm 2 by 45 degrees after fitting the fitting portion 6 in a fitting recess 3 of the body 1, the engagement portion 7 is sandwiched between the flanges 4 over and under the fitting recess 3, so that it will not be detached from the body 1 either in the axial direction or the transversal direction of the body.

The method of assembling the above-mentioned carriage will now be described.

① As shown in FIG. 1B and FIG. 3, the orientation of the fitting portion 6 of the arm 2 is made to correspond to the orientation of the outer shape of the body 1, and as shown in FIG. 1C in this orientation the arm 2 is moved (lowered) downwardly along the axial direction of the body 1 to be fitted on the body 1 from above for fitting it in a fitting recess 3. At this time, the body 1 has been heated to about 40° C., and the arm 2 is shrinkage fitted in the fitting recess 3 at normal temperature.

② As shown in FIG. 1B and FIG. 3, the arm 2 is rotated by 45 degrees. As a result, the engagement portion 7 of the arm 2 is sandwiched between the flanges 4 over and under the fitting recess 3 so that it will not be detached from the body 1 in the axial direction thereof or in the transversal direction.

③ In the above way, a plurality of arms 2 are shrinkage fitted in the fitting recesses 3 of the body 1 in the same direction as shown in FIG. 1D. At the same time, as shown in FIG. 1E, there is the space 30 between the flat 1a of the body 1 and four corners of inner periphery of the fitting portion 6 fitted in the body 1.

④ If necessary, the body 1 is pressed in its axial direction to press and caulk the engagement portions 7 of the arm 2 fitted between the flanges 4, thus securing the arms 2 to the body 1.

The molding of the plurality of arms 2 assembled in the above way to the body 1 by resin is made as follows. At this time, a moving coil 9 of the VCM (FIG. 1A) may be molded together to the body 1.

① The carriage having been assembled and the moving coil 9 are set in a resin molding die.

② Then, resin is pressure poured into the die to mold and secure the fitting portion 6 of the arm 2 in the body 1. In this case, as the resin is poured into the space 30 in the FIG. 1E, the fitting portion 6 is secured in the body 1. At the same time, the outer periphery of the moving coil 9 is molded by the resin 8, to mold the moving 9 by the resin 8 to the body 1 on the side thereof opposite the arms 2 as shown in FIG. 1E.

Figure 4A:
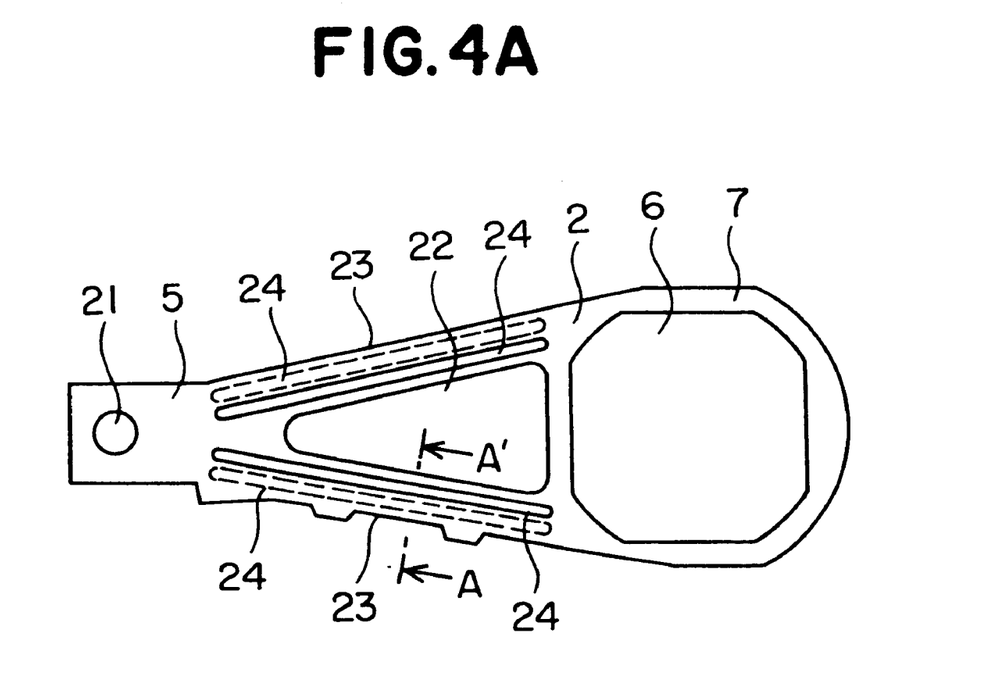
FIG. 4A is a plan view showing an arm in a carriage according to the invention.
Figure 4B:
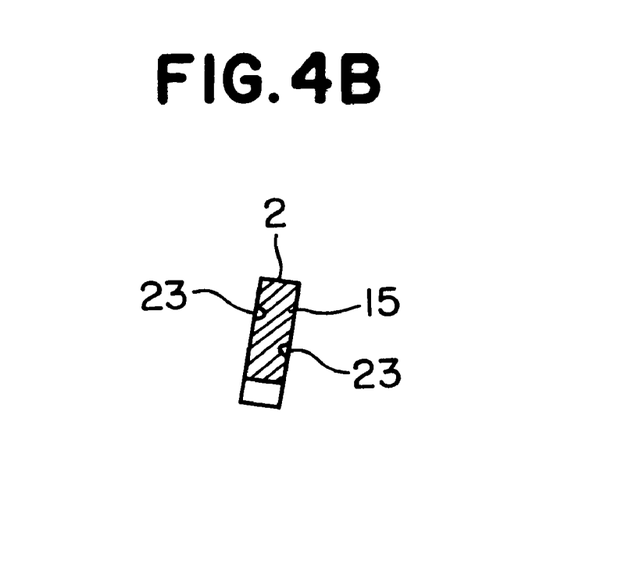
FIG. 4B is a sectional view taken along line A—A in FIG. 4A.

A second embodiment of the actuator component for a magnetic disc apparatus according to the invention will be described with reference to FIGS. 4A and 4B. This embodiment is the same in the basic structure with the first embodiment, and is different only in the structure of the arm 2. In the first embodiment the arm 2 was flat, but in this second embodiment as shown in FIGS. 4A and 4B the arm 2 has pushedly formed grooved 24 formed on the two sides of surfaces of edge portions 23 around a window 22, thus enhancing (or reinforcing) the mechanical strength of the edge portions 23. Instead of forming the pushedly formed grooves 24, it is possible to push out the material of the corresponding portions to be raised above the two sides of surfaces of the edge portions 23 for enhancing the mechanical strength thereof.

A third embodiment of the actuator component for a magnetic disc apparatus according to the invention will now be described. As shown in FIG. 5B, a bearing (rotary bearing) 12 is pressure fitted in a shaft hole 10 of the body 1 according to the invention. In this case, the rotary bearing 12 which has a preliminarily formed sleeve 11 is pressure fitted in the shaft hole 10 of the body 1 of the carriage shown in FIG. 5A, and a rotary shaft 13 is pressure fitted in the rotary bearing 12. In this case, as shown in FIG. 5A, the sleeve 11 normally has a partitioner 25 formed at an axially central position, and the rotary bearing 12 are pressure fitted in the sleeve 11 from the both ends thereof and secured to the both sides (i.e., upper and lower sides) of the paritioner 25.

Figure 6A:
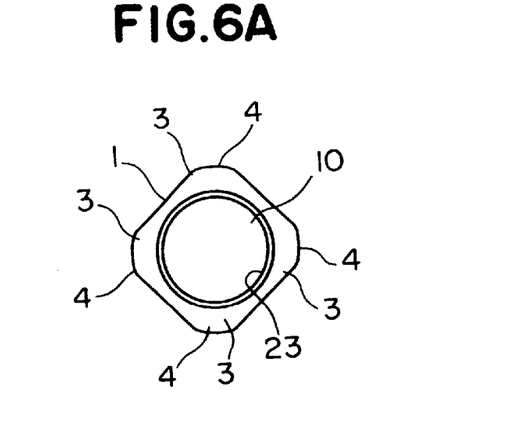
FIG. 6A is a plan view showing a body in a carriage as a second embodiment of the invention.
Figure 6B:
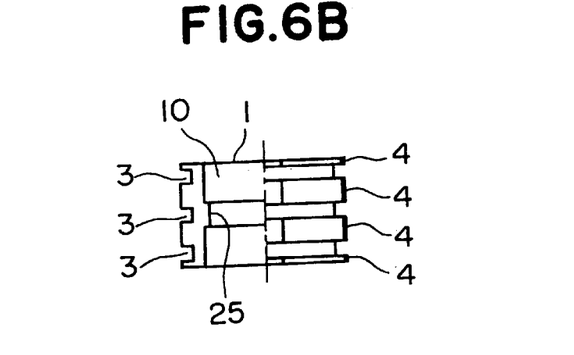
FIG. 6B is a front view, with a left part in section, showing the same body.
Figure 6C:
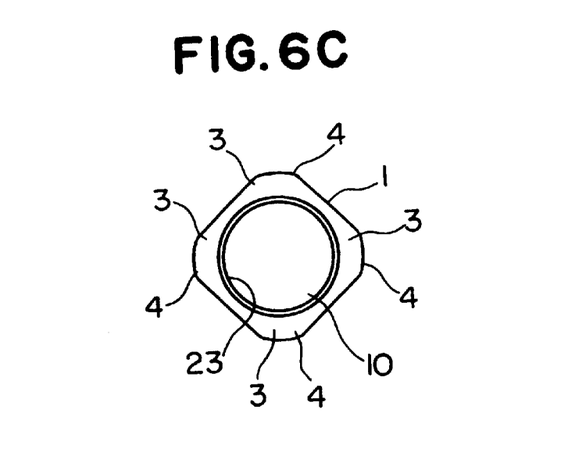
FIG. 6C is a bottom view showing the same body.

It is possible to use a rotary bearing 12 without any sleeve 11. In this case, the shaft hole 10 of the body 1 is also used as the sleeve 11, and the rotary bearing 12 is directly pressure fitted in the shaft hole 10. To this end, as shown in FIGS. 6B and 7B, a ring-like partitioner 25 is projectedly provided in the shaft hole 10 at an axially central position thereof. As shown in 7A, the rotary bearing 12 are fitted in the shaft hole 10 from the both ends thereof and secured to the both sides (i.e., upper and lower sides) thereof. As shown in FIG. 7B, the rotary shaft 13 is pressure fitted in a central hole of the bearing 12 having been pressure fitted in the shaft hole 10.

A fourth embodiment of the actuator component for a magnetic disc apparatus according to the invention will now be described. The arms 2 having been fitted in the fitting recesses 3 of the body 1 may be secured before being molded in various conceivable ways. For example, the fitting portion 6 may be bonded by an adhesive to the body 1. Alternatively, after fitting the fitting portion 6 of the arm 2 in a fitting recess 3 of the body 1, a thorough hole through the fitting portion 6 from the outer sides of the flanges of the body 1, a set pin may be inserted through the hole to tentatively set the fitting portion in position, and then the body 1 is pressed in the axial direction to caulk the arm held between the flanges 4 of the body 1 and secure the fitting portion 6 thereto.

INDUSTRIAL UTILITY

Of the actuator components (i.e., carriage bodies) for a magnetic disc apparatus according to the invention, the one in which the fitting recesses 3 are formed in the outer periphery of the cylindrical body 1, has a merit that the arms 2 can be readily fitted in the fitting recesses 3. Also, the one in which the flanges 4 are defined over, under and between adjacent ones of the recesses 3, has a merit that the arms fitted in the recesses 3 are engaged with the flanges 4 and will not be occasionally detached.

Of the actuator components (i.e., carriage arms) for a magnetic disc apparatus according to the invention, the one in which each arm 2 has the stem part having the fitting portion 6 capable of being fitted in and removed from a fitting recess 3 of the body 1, has a merit that the fitting portion 6 of the arm 2 is fitted in the fitting recess 3 of the body 1 such as to enclose the outer periphery of the fitting recess 3. The fitting portion 6 of the arm 2 thus can be firmly mounted, vibrations or resonance of the arms 2 hardly occur during the reciprocal rotation. In addition, where the arm 2 has the stem part having the engagement portion 7 for engaging with the flanges of the body 1, by fitting the fitting portion 6 of the arm 2 in a fitting recess 3 of the body 1, the engagement portion 7 comes to engage with flanges 4 of the body 1, so that the arm 2 will not be detached in the axial direction of the body 1 occasionally deviated or detached from the body 1.

Of the actuator components (i.e., carriages) for a magnetic disc apparatus according to the invention, the one in which the fitting portion 6 of the arm 2 is fitted in a fitting recess 3 of the body 1 and the engagement portion 7 of the arm 2 is engaged with flanges 4 of the body 1, has a merit that the arm 2 can be reliably mounted on the body 1, and will not be occasionally detached from the body 1 or deviated in position. It is thus possible to form the arms with a press and reduce the cost of the arms 2.

Of the actuator components (i.e., carriages) for a magnetic disc apparatus according to the invention, the one in which the fitting portion 6 of the arm 2 is fitted in a fitting recess 3 of the body 1, the engagement portion 7 is engaged with flanges 4 and the fitting portion 6 is molded by resin 8 to the body 1, has a merit that the arms 2 can be secured to the body 1 firmly and reliably and will be free from vibrations or resonance.

Of the actuator components (i.e., carriages with a movable coil) for a magnetic disc apparatus according to the invention, the one in which the fitting portion 6 of the arm 2 in a fitting recess 3 of the body 1 to have the engagement portion 7 be engaged with flanges 4 and the fitting portion 6 and the moving coil 9 of the motor are molded by resin 8 to the body 1 such as to project from the body 1 in the opposite directions, has a merit that the fitting portion 6 and the moving coil 9 can be molded by resin 8 at the same time. That is, only a single operation is needed, and the productivity is thus improved.

Of the actuator components for a magnetic disc apparatus according to the invention, the one in which the body 1 has two or more fitting recesses 3 spaced apart in the axial direction of the body 1, it is possible to fit arms in number corresponding to the number of fitting recess 3 of a single body 1. In addition, it is possible to accurately position a plurality of arms.

Of the actuator components for a magnetic disc apparatus according to the invention, the one in which the fitting portion 6 or the arm 2 is shaped into the ring shape such that it can be fitted to and removed from a fitting recess and can be fitted on the body 1 in the axial direction thereof in a predetermined orientation relative to the body 1 and also the engagement portion 7 is formed on the outer side of the fitting portion 6 by fitting the fitting portion 6 in a fitting recess 3 and turning the arm 2 it comes to engage with flanges 4 of the body 1 and prevents the detachment of the arm 2 in the axial direction of the body 1, has a merit that the fitting portion 6 can be fitted on the body 1 in the axial direction thereof and handily fitted in a fitting recess 3 in a predetermined orientation of it. In addition, by turning the arm with the fitting portion 6 fitted in the fitting recess 3, the engagement portion 7 comes to engage with flanges 4, and the arm 2 will not be detached from the body 1. It is thus possible to readily fit and secure the fitting portion 6 on and to the body 1.

Of the actuator component for a magnetic disc apparatus according to the invention, the one in which the rotary bearing 12 with sleeve 11 is mounted in the shaft hole 10 of the body, has a merit that it is possible to obtain smooth reciprocal rotation of the body 1.

Of the actuator components for a magnetic disc apparatus according to the invention, the one in which the rotary bearing 12 is directly mounted without the sleeve 11 in the shaft hole 10 of the body 1, has a merit that without the sleeve 11 the structure is correspondingly simplified, and the cost is also reduced, as well as obtaining smooth reciprocal rotation of the body 1.

What is claimed is:

1. An actuator arm assembly for a magnetic disk apparatus comprising a body reciprocally rotatable when driven by a motor and an arm mounted on the body and supporting a magnetic head mounted thereon for recording and reproduction, the arm being reciprocally rotated with the reciprocal rotation of and in the same directions as the body for causing reciprocal rotation of the magnetic head across a disc in the magnetic disc apparatus, wherein:

the body is formed separately from the arm and angularly cylindrical in shape, having projections on a part of is outer periphery, and its outer periphery has a fitting recess, in which a ring-shaped fitting portion of the arm can be fitted, and projections or flanges defined over, under and between adjacent ones of the fitting recesses, the fitting portion of the arm being capable of being moved along the axial direction of the body and being fitted on the body around the flanges in a predetermined orientation relative to the body, and by turning the arm with the fitting portion thereof fitted on the body the fitting portion is fitted in the fitting recess, while an engagement portion on the outer side of the fitting portion is engaged with the flanges and prevents the detachment of the arm in the axial direction of the body.

2. The actuator arm assembly for a magnetic disk apparatus according to claim 1, wherein the body has two or more fitting recesses spaced apart in its axial direction.

3. An actuator arm assembly for a magnetic disk apparatus comprising a body reciprocally rotatable when driven by a motor and an arm mounted on the body and supporting a magnetic head mounted thereon for recording and reproduction, the arm being reciprocally rotated with the reciprocal rotation of and in the same directions as the body for causing reciprocal rotation of the magnetic head across a disc in the magnetic disc apparatus, wherein:

the arm is formed separately from the body and has a head mounting portion formed in a free end part and a ring-shaped fitting portion formed in a stem part and an engagement portion formed in the outside of the fitting portion, a magnetic head being capable of being mounted on the head mounting portion, the fitting portion has an inner shape that is the same or almost the same as an outer shape of an angularly cylindrical body having and outer periphery with projections or flanges on a part thereof, and being capable of being moved along the axial direction of the body around the flanges in a predetermined orientation to be fitted on the body, and then being capable of being fitted in a fitting recess of the body by turning the arm, the engagement portion being engaged, when the fitting portion is fitted in the fitting recess, with the flanges of the body to prevent the detachment of the arm in the axial direction of the body.

4. The actuator arm assembly for a magnetic disk apparatus according to claim 3, wherein the fitting portion of the arm is shaped into a ring shape so that it can be fitted in and removed from the fitting recess, the fitting portion being capable of being fitted on the body from the upper end thereof in a predetermined orientation relative thereto for being fitted in the fitting recess, the engagement portion being formed on the outer side of the fitting portion such that by turning the arm with the fitting portion fitted in the fitting recess it is brought into engagement with the flanges of the body and prevents the detachment of the arm in the axial direction of the body.

5. An actuator arm assembly for a magnetic disk apparatus comprising a body reciprocally rotatable when driven by a motor and an arm mounted on the body and supporting a magnetic head mounted thereon for recording and reproduction, the arm being reciprocally rotated with the reciprocal rotation of and in the same directions as the body for causing reciprocal rotation of the magnetic head across a disc in the magnetic disc apparatus, wherein:

the body is formed separately from the arm and angularly cylindrical in shape, having projections on a part of its outer periphery, and its outer periphery has a fitting recess, in which a ring-shaped fitting portion of the arm can be fitted, and projections or flanges defined over, under and between adjacent ones of the fitting recesses, and the arm has a head mounting portion formed in a free end part and a ring-shaped fitting portion and an engagement portion formed in a stem part, a magnetic head being capable of being mounted on the head mounting portion, the fitting portion being capable of being moved along the axial direction of the body and being fitted on the angularly cylindrical body around the flanges thereof in a predetermined orientation relative to the body and then fitted in the fitting recess of the body by turning the arm, the engagement portion being engaged with the flanges of the body by fitting the fitting portion in the fitting recess and thus preventing the detachment of the arm in the axial direction of the body.

6. The actuator arm assembly for a magnetic disk apparatus according to claim 5, wherein the body has a shaft hole, a rotary bearing with a sleeve being mounted in the shaft hole, a rotary shaft being mounted in the rotary bearing.

7. An actuator arm assembly for a magnetic disk apparatus according to claim 5, wherein the body has a shaft hole, a sleeve-less rotary bearing being mounted in the shaft hole, a rotary shaft being mounted in the sleeve-less rotary bearing.

8. An actuator arm assembly for a magnetic disk apparatus comprising a body reciprocally rotatable when driven by a motor and an arm mounted on the body and supporting a magnetic head mounted thereon for recording and reproduction, the arm being reciprocally rotated with the reciprocal rotation of and in the same directions as the body for causing reciprocal rotation of the magnetic head across a disc in the magnetic disc apparatus, wherein:

the body is formed separately from the arm and angularly cylindrical in shape, having projections on a part of its outer periphery, and its outer periphery has a fitting recess, in which a ring-shaped fitting portion of the arm can be fitted, and projections or flanges defined over, under and between adjacent ones of the fitting recesses, and the arm has a head mounting portion formed in a free end part and a ring-shaped fitting portion formed in a stem part and an engagement portion formed on the outside of the fitting portion, a magnetic head capable of being mounted on the head mounting portion, the fitting portion having an inner shape that is the same or almost the same as an outer shape of an angularly cylindrical body, and being capable of being moved along the axial direction of the body around the flanges in a predetermined orientation to be fitted on the body, and then being capable of being fitted in a fitting recess of the body by turning the arm, the engagement portion being engaged, when the fitting portion is fitted in the fitting recess, with the flanges of the body to prevent the detachment of the arm in the axial direction of the body, the engagement portion being engaged with the flanges by fitting the fitting portion of the arm in the fitness recess of the body, the fitting portion being molded by resin to the body.

9. An actuator arm assembly for a magnetic disk apparatus comprising a body reciprocally rotatable when driven by a motor and an arm mounted on the body and supporting a magnetic head mounted thereon for recording and reproducing, the arm being reciprocally rotated with the reciprocal rotation of and in the same directions as the body for causing reciprocal rotation of the magnetic head across a disc in the magnetic disc apparatus, wherein:

the body is formed separately from the arm angularly cylindrical in shape, having projections on a part of its outer periphery, and its outer periphery has a fitting recess, in which a ring-shaped fitting portion of the arm can be fitted, and projections of flanges defined over, under and between adjacent ones of the fitting recesses, and the arm has a head mounting portion formed in a free end part and a ring-shaped fitting portion formed in a stem part and an engagement portion formed on the outside of the fitting portion, a magnetic head being capable of being mounted on the head mounting portion, the fitting portion having an inner shape that is the same or almost the same as an outer shape of an angularly cylindrical body, and being capable of being moved along the axial direction of the body around the flanges in a predetermined orientation to be fitted on the body, and then being capable of being fitted in a fitting recess of the body by turning the arm, the engagement portion being engaged, when the fitting portion is fitted in the fitting recess with the flanges of the body to prevent the detachment of the arm in the axial direction of the body, the engagement portion being engaged with the flanges by fitting the fitting portion of the arm in the fitting recess of the body, the fitting potion and a moving coil of the motor being molded by resin to the body such as to project from the body in opposite directions.

10. An actuator arm assembly for a magnetic disk apparatus comprising a body reciprocally rotatable when driven by a motor and an arm mounted on the body and supporting a magnetic head mounted thereon for recording and reproduction, the arm being reciprocally rotated with the reciprocal rotation of and in the same directions as the body for causing reciprocal rotation of the magnetic head across a disk in the magnetic disk apparatus, wherein:

the body is formed separately from the arm and angularly cylindrical in shape, having projections on a part of its outer periphery, and it outer periphery has a fitting recess, in which a ring-shaped fitting portion of the arm can be fitted, and projections of flanges defined over, under and between adjacent ones of the fitting recesses, the arm has a head mounting portion formed in a free end part and a ring-shaped fitting portion formed in a stem part and an engagement portion formed in the outside of the fitting portion, a magnetic head being capable of being mounted on the head mounting portion, the fitting portion has an inner shape that is the same or almost the same as an outer shape of an angularly cylindrical body, and being capable of being moved along the axial direction of the body around the flanges in a predetermined orientation to be fitted on the body and then being capable of being fitted in a fitting recess of the body by turning the arm, the engagement portion being engaged, when the fitting portion is fitted in the fitting recess, with the flanges of the body to prevent the detachment of the arm in the axial direction of the body, the engagement portion being engaged with the flanges by fitting the fitting portion of the arm in the fitting recess of the body, the fitting portion being molded by resin to the body, and the resin is poured into the space between the flat on the outer periphery of the body and inner periphery of the ring-shaped fitting portion of the arm.

* * * * *